INVENTORS
ROBERT B. LIGHTNER
BENTON A. WHITEMAN

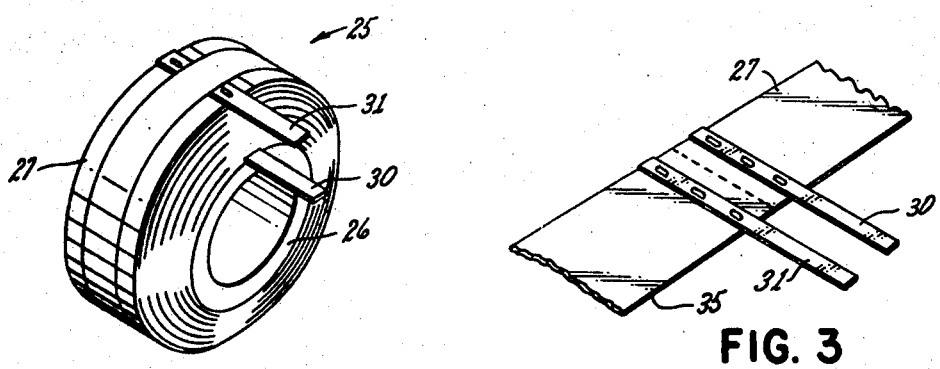
FIG. 1
FIG. 3
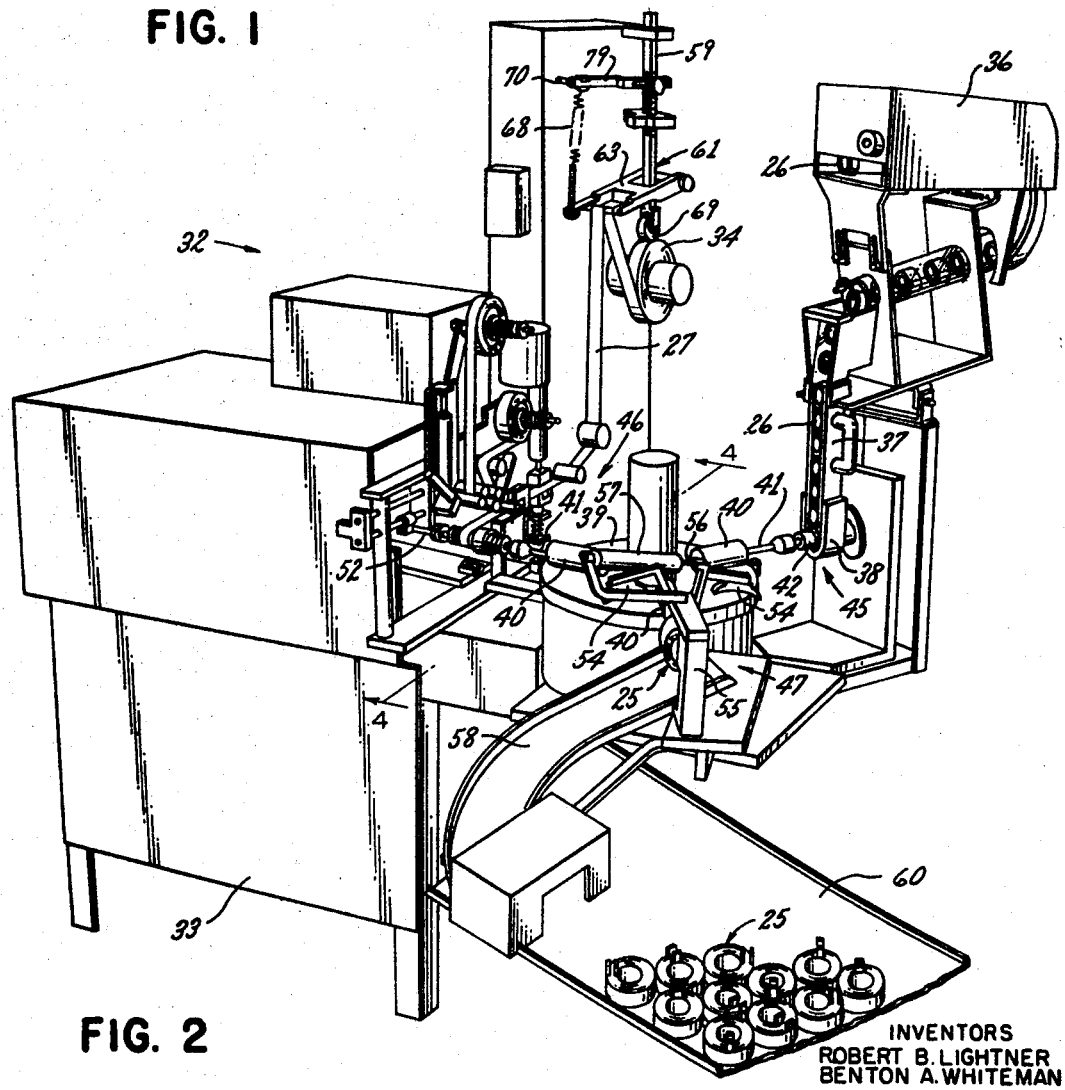
FIG. 2
INVENTORS
ROBERT B. LIGHTNER
BENTON A. WHITEMAN
BY Glenn, Palmer & Lyne
THEIR ATTORNEYS

BY *Glenn, Palmer & Lyne*

THEIR ATTORNEYS

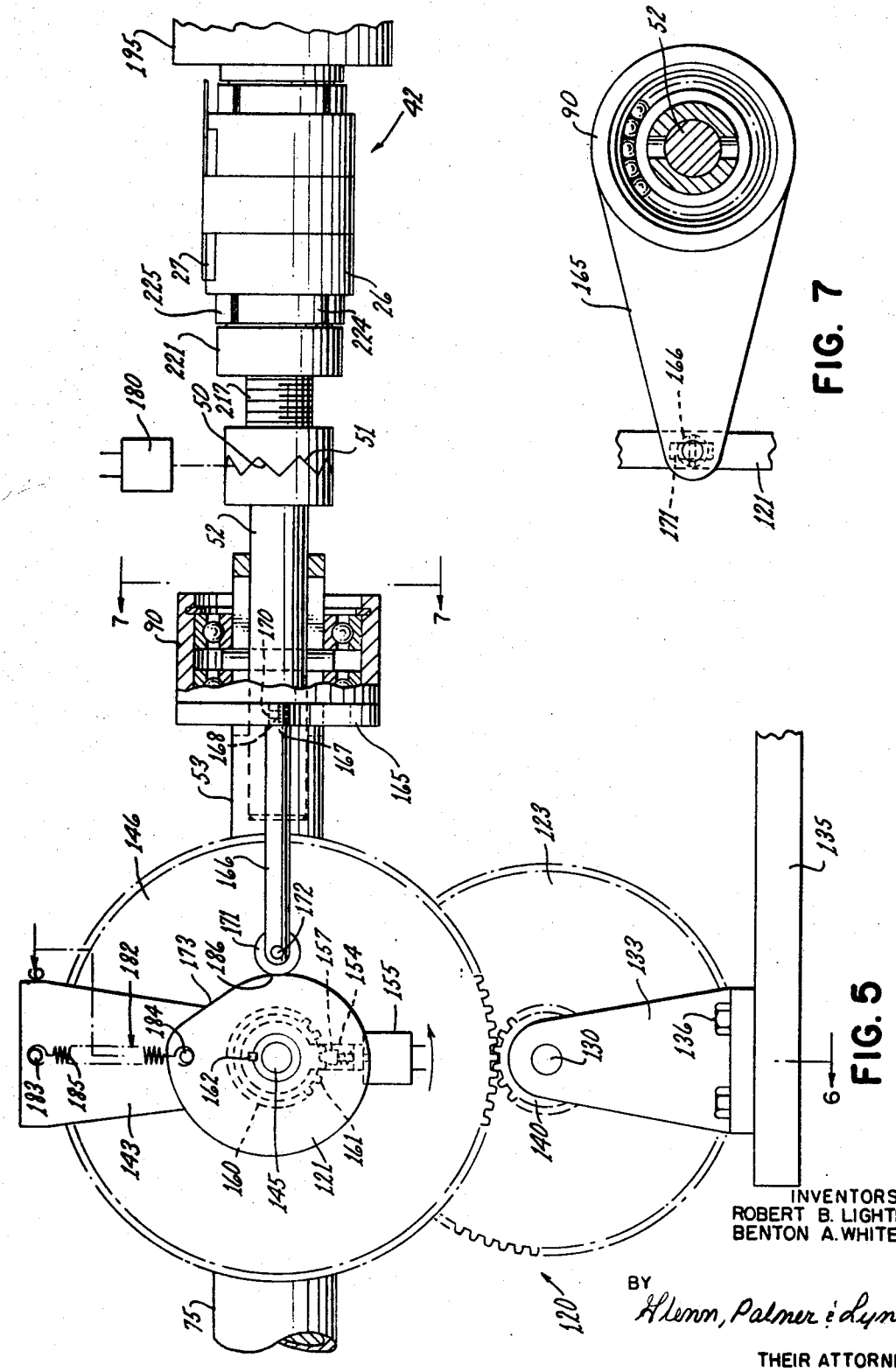

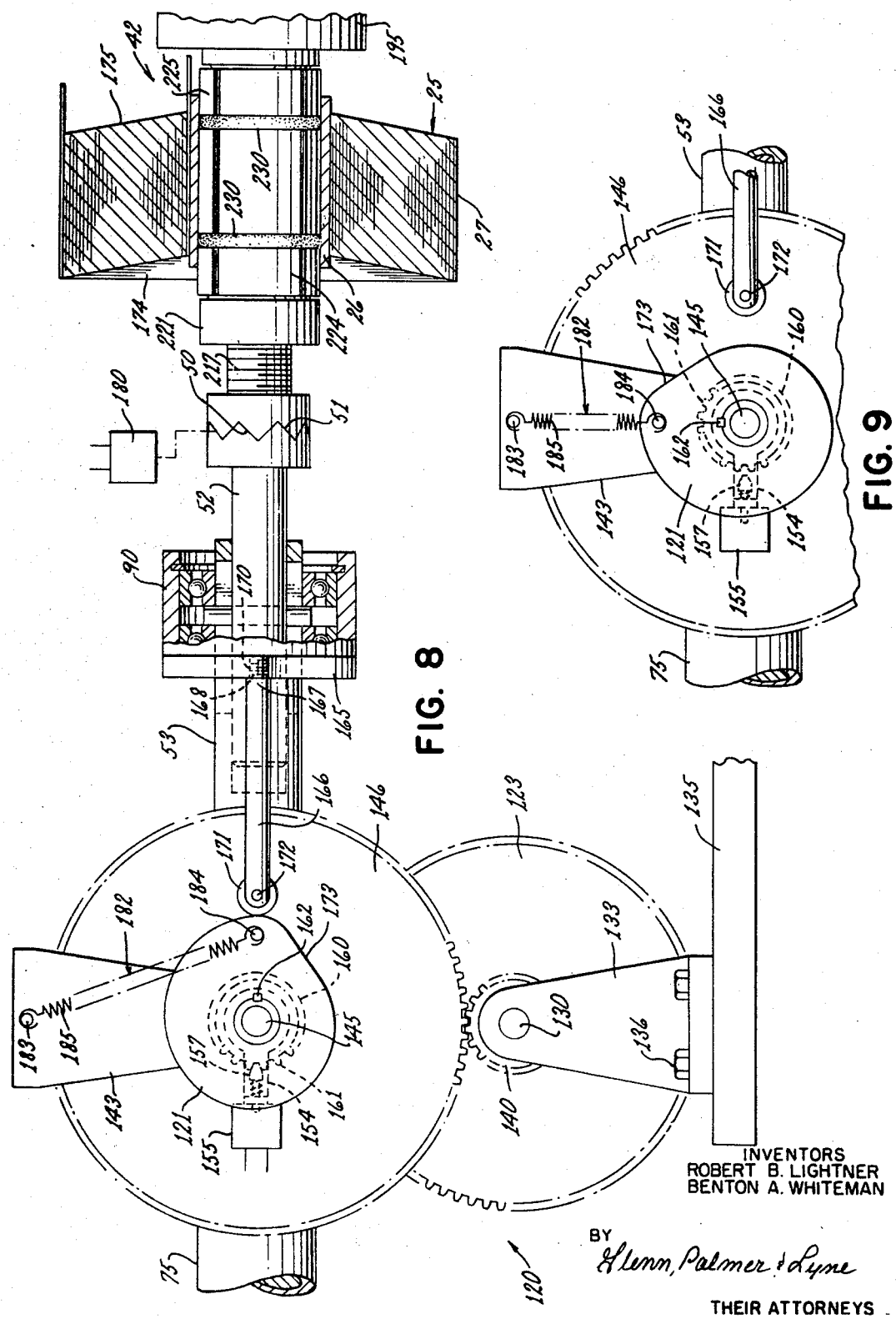

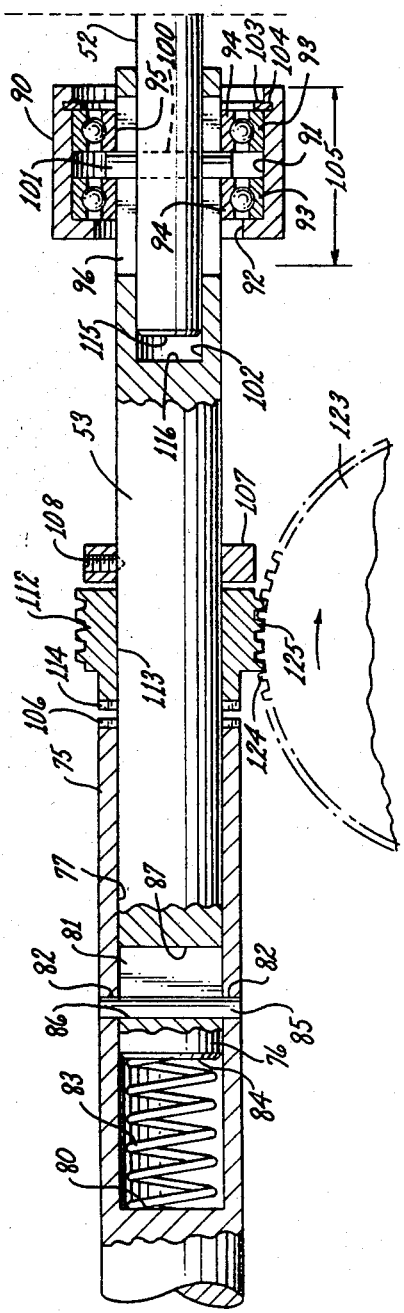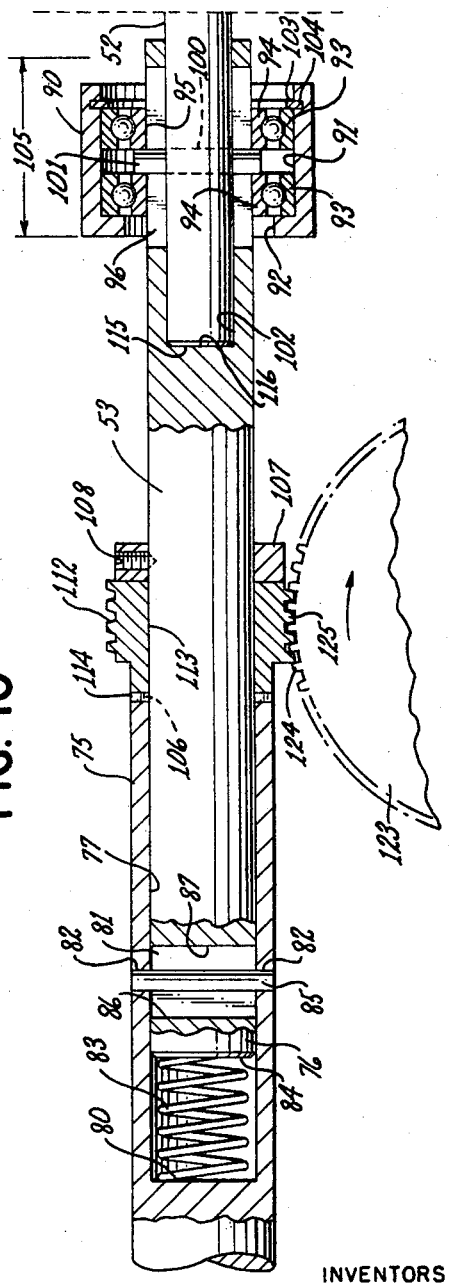
INVENTORS
ROBERT B. LIGHTNER
BENTON A. WHITEMAN
BY Glenn, Palmer & Lyne
THEIR ATTORNEYS

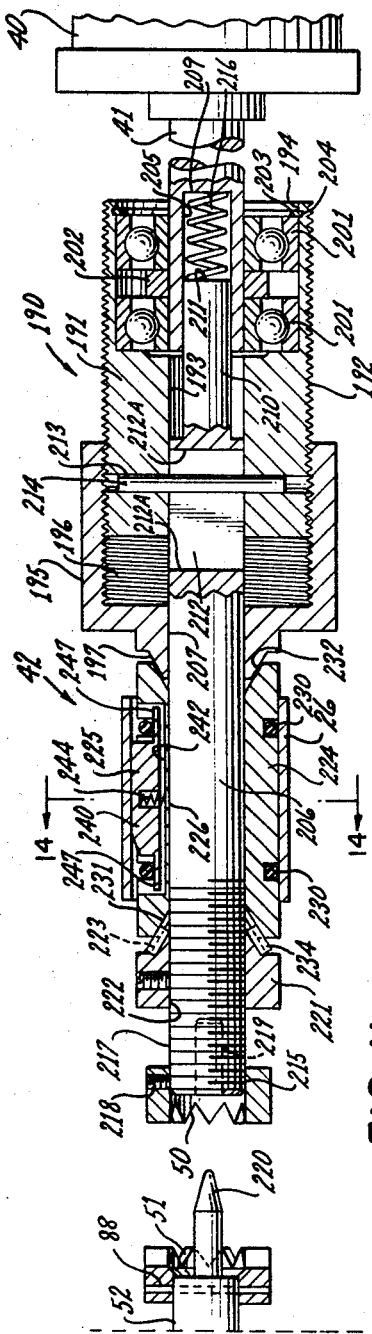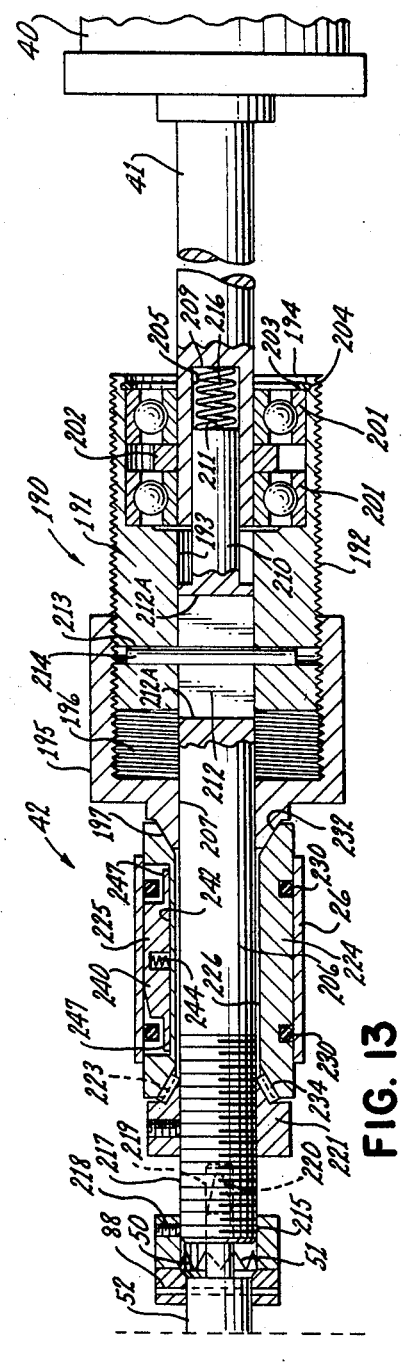
INVENTORS
ROBERT B. LIGHTNER
BENTON A. WHITEMAN
THEIR ATTORNEYS

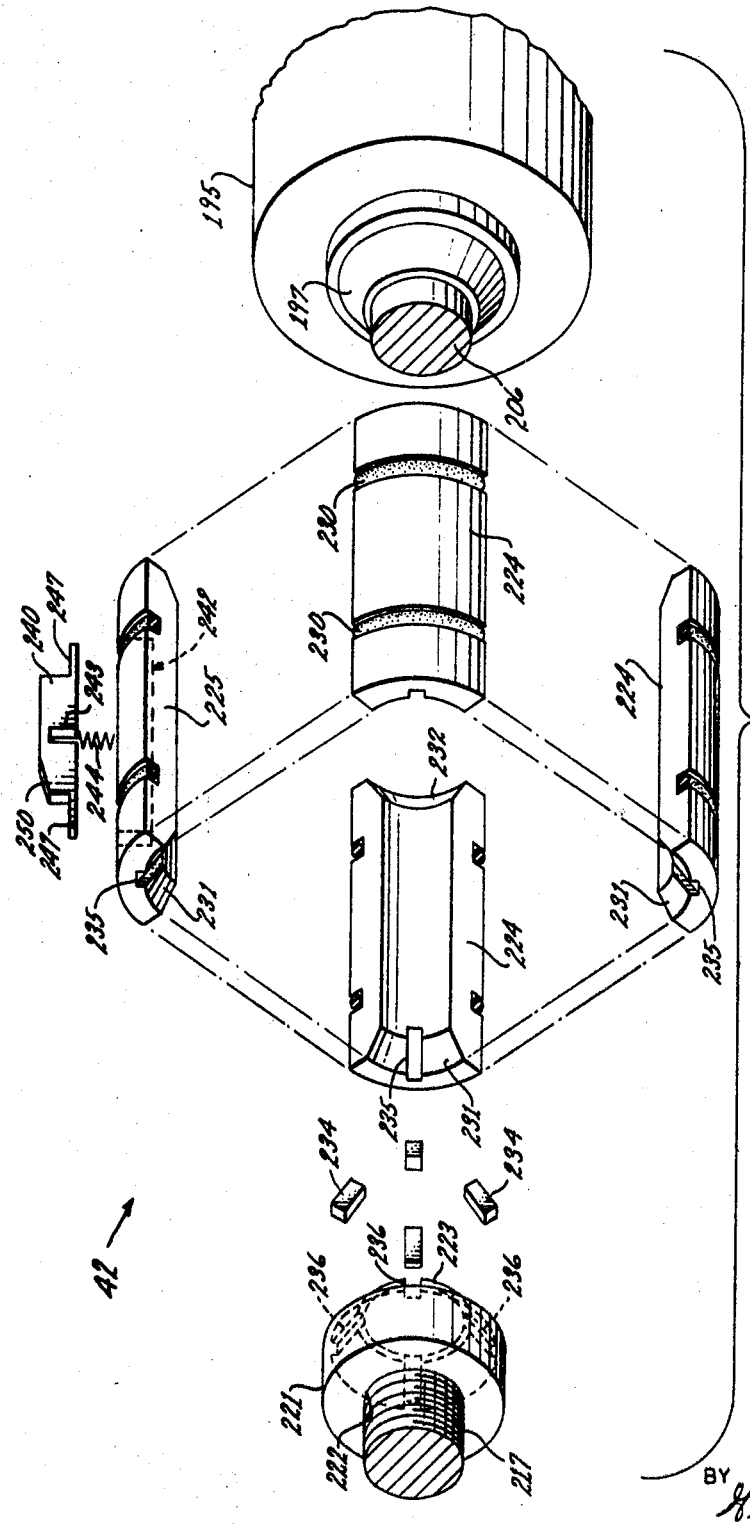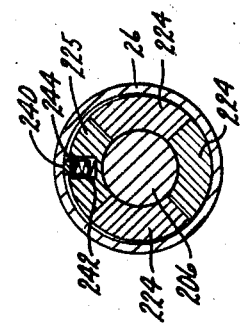

INVENTORS
ROBERT B. LIGHTNER
BENTON A. WHITEMAN

BY *Glenn, Palmer & Lyne*

THEIR ATTORNEYS

United States Patent Office 3,474,529
Patented Oct. 28, 1969

3,474,529
APPARATUS FOR AND METHOD OF MAKING A STRIP CONDUCTOR COIL CONSTRUCTION
Robert B. Lightner, Henrico, and Benton A. Whiteman, Richmond, Va., assignors to Reynolds Metals Company, Richmond, Va., a corporation of Delaware
Filed June 8, 1967, Ser. No. 644,535
Int. Cl. H01g *13/00;* H01r *43/00*
U.S. Cl. 29—605         20 Claims

ABSTRACT OF THE DISCLOSURE

This disclosure relates to an appartus for and method of making a strip conductor coil construction, or the like, wherein an elongated strip of electrically conductive material is supplied to a winding station and the end thereof being wound is held in a substantially fixed plane during winding on a rotatable support therefor. With the end portion being held in such fixed plane the rotatable support is moved relative to such fixed plane to define a coil construction having certain coils axially offset relative to other coils of such coil construction.

CROSS-REFERENCE TO RELATED APPLICATIONS

This application is related to co-pending patent applications Ser. No. 598,347, filed Dec. 1, 1966 and Ser. No. 497,069, filed Oct. 18, 1965.

BACKGROUND OF THE INVENTION

Electrical strip conductor coils, or the like, may require that certain individual coils thereof be axially offset with respect to other individual coils to enable installation in suitable associated housing means, for example. It has been previously proposed to control the configuration of a given coil construction during the winding thereof by moving the outer end portion of an elongated strip being wound axially along an associated coil winding mandrel which is rotated in a substantially fixed position. Inherently, such a technique is inefficient and makes it difficult to precisely control the configuration of a given coil during the winding thereof.

SUMMARY

This invention provides an improved apparatus for and method of making a coil construction more efficiently and having a precisely controlled configuration by positively controlling the position of support means on which an elongated strip conductor, for example, is wound while holding edge means of the end portion of such strip conductor being wound substantially in a fixed plane during the winding operation.

Other details, uses, and advantages of this invention will become apparent as the following description of the exemplary embodiments thereof presented in th accompanying drawing proceeds.

BRIEF DESCRIPTION OF THE DRAWING

The accompanying drawing illustrates exemplary embodiments of this invention, in which FIGURE 1 is a perspective view of an exemplary strip conductor coil made by the improved apparatus and method of this invention;

FIGURE 2 is a perspective view illustrating one exemplary embodiment of the improved apparatus and method of this invention;

FIGURE 3 is a fragmentary perspective view illustrating electrical leads attached by the apparatus of FIGURE 2 to an elongated strip of electrically conductive material used in forming the coil construction of FIGURE 1;

FIGURE 5 is a view in elevation with parts in section and parts broken away illustrating one exemplary embodiment of the improved apparatus of this invention which is used to provide a coil construction having certain coils axially offset with respect to other coils of such coil construction and showing each apparatus prior to starting the winding of a coil construction;

FIGURE 7 is a fragmentary view taken on the line 7—7 of FIGURE 5;

FIGURE 8 is a view similar to FIGURE 5 showing the apparatus of FIGURE 5 at the completion of a coil construction;

FIGURE 9 is a fragmentary view particularly illustrating rotatable cam means of the apparatus of FIGURE 5 in its uncoupled condition;

FIGURE 10 is a view in elevation with parts in section and parts broken away particularly illustrating drive shaft means comprising the apparatus of FIGURE 2 prior to being engaged by driven means at the terminal end of rotatable support means;

FIGURE 11 is a view, adapted to be aligned with FIGURE 10, with parts in section and parts broken away and particularly illustrating rotatable support means shown as a radially expandable core carrying mandrel having driven means at its terminal end adapted to engage drive means provided at the terminal end of the drive shaft means shown in FIGURE 10;

FIGURE 12 is a view similar to FIGURE 10 with the driven means in the core carrying mandrel operatively connected with the drive means at the outer end of the drive shaft means;

FIGURE 13 is a view similar to FIGURE 11 with the driven means operatively connected to the drive means;

FIGURE 14 is a cross-sectional view on the line 14—14 of FIGURE 11;

FIGURE 15 is an exploded perspective view particularly showing cylindrical segments and associated parts comprising the radially expandable mandrel shown in FIGURES 11 and 13;

DESCRIPTION OF THE ILLUSTRATED EXEMPLARY EMBODIMENTS

Figure 4:
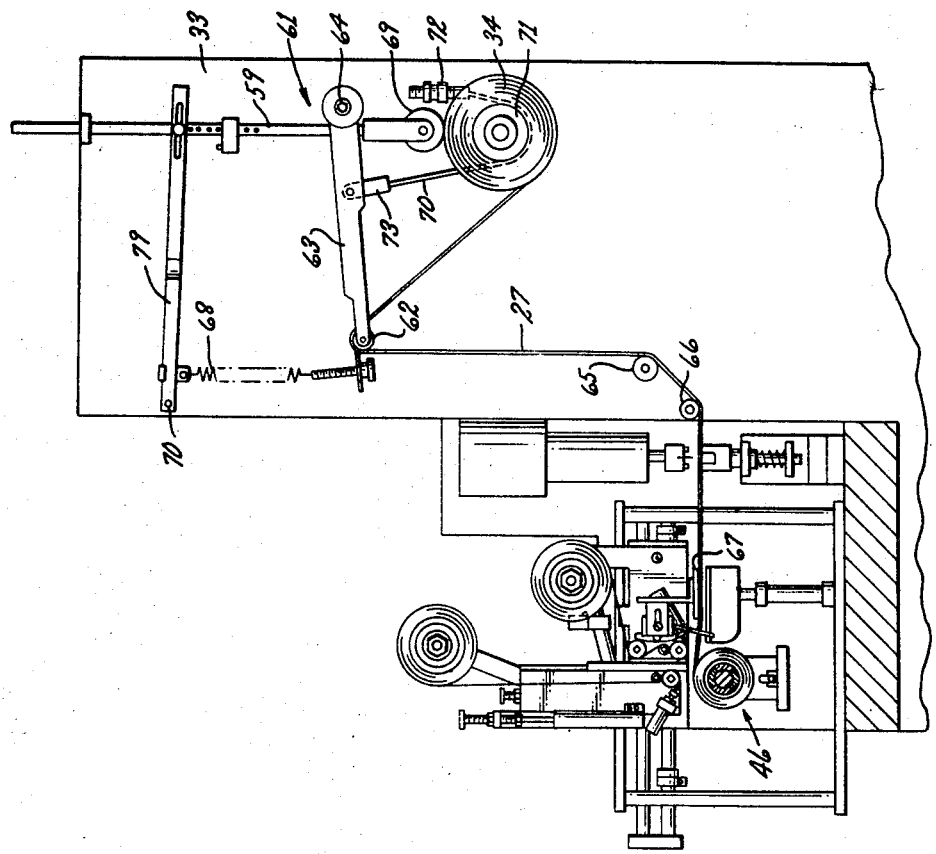
FIGURE 4 is a fragmentary sectional view taken on the line 4—4 of FIGURE 2.

An exemplary strip conductor coil construction or coil made by the apparatus and method of this invention is shown in FIGURE 1 and indicated generally by the reference numeral 25. Coil 25 comprises a tubular and substantially right circular cylindrical core element 26 which has a ribbon or strip 27 of electrically conductive material wound thereon in a manner as will be hereinafter described. Strip 27 has inner end means comprising an inner electrical lead 30 fixed thereto and outer end means comprising an outer electrical lead 31 suitably fixed thereto. The completed coil 25 is adapted to be installed in an associated electrical system with its leads 30 and 31 suitably electrically connected in a known manner.

In many applications the housing means, or the like, provided immediately adjacent coil 25 may have a special configuration requiring that coil 25 be provided with an outer peripheral configuration corresponding to such adjacent housing means. For example, such adjacent housing means may have end bells which are substantially frusto-conical thus requiring that coil 25 have end surfaces which are tapered or frusto-conical in a corresponding manner and essentially as shown in FIGURE 1.

In the exemplary coil 25 presented in FIGURE 1 and made by the apparatus and method of this invention the under side of the elongated strip of conductive material 27 is preferably prelaminated to an insulative strip or coating of insulating material before the same is wound on the core element 26 to provide electrical insulation means between adjacent coils of the strip of conductive material 27. However, if desired, strip 27 can be wound on core element 26 in unison with a separate strip of insulating material so that the strip of insulating material is interleaved between adjacent coils of the strip of conductive material 27 to electrically insulate adjacent coils of strip 27 from each other.

The method and apparatus of this invention for forming the strip conductor coil construction 25 of FIGURE 1 in a substantially continuous manner is generally indicated by the reference numeral 32 in FIGURE 2. Apparatus 32 includes a frame structure 33 rotatably carrying a supply roll 34 of conductive strip material 27. As previously stated, the strip material 27 preferably has a strip or coating 35 of insulating material laminated to its lower surface, as illustrated in FIGURE 3, to provide electrical insulation between adjoining coils.

The tubular core elements 26 may be made of cardboard or the like and are contained in a suitable hopper means or hopper 36. Hopper 36 has a downwardly extending chute 37 extending from its lower end. Each core element is adapted to be serially fed into a retainer 38 provided at the terminal lower end of chute 37 and supported to enable it to be easily picked up by an associated mandrel in a manner to be subsequently described.

As illustrated in FIGURE 2, frame structure 33 carries a rotary table 39 which is adapted to be indexed in a rotary manner about a fixed vertical axis. Table 39 carries three actuating means or actuators shown as three fluid cylinders each designated by the numeral 40.

Each cylinder 40 has a telescoping rod 41 which carries support means enabling coil 25 to be formed thereon and such support means comprises a radially expandable and freely rotatable mandrel 42 carried at the terminal end of telescoping rod 41. Each cylinder 40 is adapted to extend and yieldingly hold its mandrel 42 into operative engagement with drive means therefor to be described in detail subsequently.

The table 39 is adapted to index the mandrels 42 through three stations 45, 46, and 47. When a mandrel 42 is indexed to station 45, the associated cylinder 40 extends associated rod 41 radially outwardly telescoping mandrel 42 within a core element 26 supported within retainer 38 at the lower end of hopper 36.

When the mandrel 42 at station 45 has a core 26 thereon, the associated piston rod 41 is retracted by cylinder 40 so that the core 26 is carried by mandrel 42 out of the retainer 38 whereby such retracted mandrel can be indexed from station 45 to winding station 46. Hopper 36 contains a plurality of cores 26 which are adapted to be serially dropped into retainer 38 through chute 37 as previously mentioned. As each core 26 is removed by an associated mandrel from retainer 38 another core 26 drops in its place.

With the core carrying mandrel 42 now at station 46, the piston rod 41 thereof is extended to interconnect mandrel 42 by suitable driven clutch means 50 provided in its terminal outer end to suitable cooperating driving clutch means 51 provided on an axially telescoping end portion 52 of drive means shown as a rotatable drive shaft 53 comprising winding apparatus 32, see FIGURES 10–13. As drive shaft 53 is rotated, the same rotates mandrel 42 at station 46 to cause elongated strip 27 to be wound on the core 26 carried by the rotating mandrel 42 in a manner as will be hereinafter described.

After a completed strip conductor coil 25 has been formed on mandrel 42 at station 46, the associated piston rod 41 is retracted to thereby disconnect the driven mandrel 42 from drive shaft 53 and specifically to thereby move driven clutch means 50 away from driving clutch 51, whereby the retracted mandrel 42 is then indexed from station 46 to station 47. With the completed strip conductor coil 25 on mandrel 42 at station 47, the associated piston rod 41 is extended whereby the strip conductor coil 25 is held in a position at the station 47 so that a pair of stripping members each designated by the numeral 54, see FIGURE 2, can strip the finished strip conductor coil from mandrel 42.

The stripping members 54 are pivotally mounted to a support 55 by suitable pivot pins respectively carrying pinion gears disposed in meshing relation with each other. One of the stripping members 54 is interconnected to a piston rod 56 adapted to be extended and retracted by a fluid cylinder 57 carried by support 55. Thus, with a completed strip conductor coil 25 being held at station 47 by an extended mandrel 42, cylinder 57 is actuated to telescope its rod 56 outwardly and through the action of the above mentioned pinion gears stripping members 54 are brought into clamping engagement in a known manner on opposite sides of coil 25.

With the strip coductor coil 25 now firmly clamped between the stripping members 54 retraction of the piston rod 41 of the mandrel 42 at station 47 pulls such mandrel out of the core 26 of the completed strip conductor coil 25 so that the particular mandrel 42 can be subsequently indexed to the station 45 by indexing table 39. With the mandrel 42 at station 47 now retracted from within core 26 of the completed strip conductor coil 25, the cylinder 57 can be deactuated to return the stripping members 54 to the open position illustrated in FIGURE 2 whereby such members drop the completed strip conductor coil 25 onto a chute means 58. The completed strip conductor coil 25 moves down chute 58 to a table 60 for subsequent testing, packaging and the like of the completed strip conductor coils 25 produced by apparatus 32.

As illustrated particularly in FIGURE 4, the elongated strip 27 is adapted to be fed from supply roll 34 through suitable slack reducing and tension applying roller device designated generally by the numeral 61. Thus, strip 27 passes from its free wheeling supply roll 34 around a roller 62 carried by a frame means 63 of device 61 which is pivotally mounted to the frame 33 of apparatus 32 by a pivot means 64. Strip 27 continues from roller 62 around a pair of idler rolls 65 and 66 and along a combination guide means and bearing surface means designated by the numeral 67 to winding station 46 so that edge means of the terminal end portion of strip 27 being wound is held substantially in a fixed vertical plane during winding thereof at station 46.

A rod 59 is slidably carried by frame means 63 and has a roller 69 rotatably supported at its lower end and resting on supply roll 34. An arm 79 is provided and has one end pivotally mounted to the frame 33 by pivot means 70 and its opposite and adjustably carried by rod 59. Arm 79 is interconnected to member 63 by an adjustable tension spring 68.

A suitable braking system is also provided for supply roll 34 and comprises a brake band 70 passed around a roller 71 which carries the supply roll 34. Band 70 has one end 72 fixed to the frame structure 33 while the other end 73 is fastened to the frame means 63. It is to be understood that the purpose of the breaking system for the supply roll 34 is to cooperate with device 61 to provide a uniform tension on the strip 27 as it is fed through the apparatus 32; act as a shock absorbing means, particularly when the apparatus 32 is started; and to overcome the inertia of the rotating supply roll 34 when apparatus 32 is stopped.

As supply roll 34 is continuously used, less and less spring tension by spring 68 is needed whereby the interaction of the linkages comprising device 61 together with spring 68 automatically provides the desired tension. For example, as the supply roll 34 decreases in diameter, the roller 69 carries member 59 downwardly to thereby carry the right end of arm 79 downwardly to lessen the tension of spring 68 the correct amount.

The detailed description will now proceed with a presentation of moving means shown in this exemplary embodiment of the invention as mechanical cam means which is used to move the terminal end portion 52 of drive shaft 53 in opposition to the yeldable and substantially constant force holding action provided by an associated actuator 40 to enable forming of coil 25.

As seen in FIGURES 10 and 12 drive shaft 53 has a rearward portion designated by the numeral 75 which is adapted to support an inner end portion of main shaft 53. A cylindrical bore 77 extends axially inwardly from the end of shaft portion 75 and terminates in a surface 80 to define a blind hole in the outer end portion of member 75.

Shaft 53 has a substantially rectangular slot 81 provided in its end portion 76 extending substantially diametrically thereacross and rectangular slot 81 is adapted to be aligned between a pair of openings each designated by the numeral 82 provided at diametrically opposite positions in member 75. A spring shown as a compression spring 83 is provided in cylindrical bore 77 so that it acts between surface 80 and the terminal inner end surface 84 of main drive shaft portion 53.

Drive shaft 53 is installed in bore 77 of member 75 so that compression spring 83 is axially compressed and a pin designated by the numeral 85 is extended through openings 82 in member 75 and rectangular slot 81 so as to hold drive shaft 53 in position within member 75. The mechanical arrangement is such that rectangular slot 81 enables drive shaft 53 to move axially a limited distance as determined by the width of rectangular slot 81. Thus, the outward movement of drive shaft 53 is limited by surface 86 defining the inner wall of rectangular slot 81 engaging pin 85. Likewise the inward movement of shaft 53 is limited by a surface 87 defining an opposite wall of rectangular slot 81 engaging pin 85. The entire drive shaft 53 is thus urged to the right as viewed in FIGURE 10 by spring 83 so that it is held by spring 83 against pin 85.

Drive shaft 53 is driven by any suitable drive motor means or drive motor which may drive shaft 53 directly or may drive inner portion 75 and hence shaft portion 53 through coupling pin 85. In this example of the invention the inner shaft portion 75 is preferably driven by an electric drive motor through suitable gear means.

Drive shaft 53 has a terminal outer end portion 52 which has drive means or driving clutch face means 51 fixed thereto as previously mentioned. Clutch face means 51 is preferably fixed to end portion 52 by a pin 88. The outer end portion 52 of drive shaft 53 is supported for limited axial movement relative to drive shaft 53 while being coupled so that rotation of drive shaft 53 either clockwise or counterclockwise will provide simultaneous rotation of end portion 52.

The means for supporting end portion 52 so that relative axial movement between end portion 52 and drive shaft 53 may be provided will now be described and comprises a sleeve 90 which has a central substantially cylindrical bore 91 extending axially inwardly from its outer end and which has an inner smaller diameter cylindrical portion as shown at 92 which is easily slid over the outer end of drive shaft 53.

Sleeve 90 has a pair of ball bearings each designated by the numeral 93 supported therein spaced apart relation. The inner races of ball bearings 93 each designated by the numeral 94 are free to rotate and each has the same diameter indicated by the numeral 95 which enables sleeve 90 to be axially slid over the outside diameter of drive shaft 53.

The outer end portion of drive shaft 53 has a rectangular slot 96 extending substantially diametrically therethrough. Shaft 52 has a cylindrical opening 100 extending through it and as seen in the drawing, a pin 101 is provided and suitably fixed in position through opening 100 of shaft portion 52. Pin 101 has a length which is longer than the outside diameter of shaft 53 for a purpose as will be presently apparent.

The terminal outer end of shaft 53 also has a cylindrical bore 102 extending avially therealong enabling shaft portion 52 to be inserted within bore 102 so that it is freely slidable. Shaft portion 52 is thus inserted in position in bore 102 and pin 101 is extended through rectangular slot 96 and suitably fixed in opening 100 provided in shaft portion 52.

Sleeve 90 is installed so that one of its ball bearings 93 is arranged on one side of pin 101 and its other ball bearing 93 is arranged on the opposite side of pin 101 and it will be seen that the length of pin 101 is longer than the inside diameter of the inner races 94. Sleeve 90 has a snap ring, or the like, which is installed in a suitable annular groove 104 provided in the outer end portion of sleeve 90 to hold sleeve 90 with its ball bearings 93 in position on opposite sides of pin 101.

This mechanical structural arrangement enables sleeve 90 to slide axially along shaft 53 for a limited distance as determined by the width of rectangular slot 96 provided in shaft 53 and shown at 105. As sleeve 90 is moved outwardly, in a manner to be described in detail subsequently, the inner race 94 of inner ball bearing 93 engages pin 101 and thereby moves pin 101 along rectangular slot 96 to thereby also move shaft portion 52 outwardly in a corresponding manner. In a similar manner inward movement of shaft portion 52 causes movement of pin 101 fixed thereto along rectangular slot 96 causing the outer end portions of pin 101 to engage inner races 94 of the inner ball bearing 93 to thereby move the entire slide 90 inwardly.

Thus, it is seen that upon moving the shaft portion 52 axially in either direction slide 90 is carried along shaft 53 in a corresponding manner. Also, upon moving slide 90 in either direction it will be seen that shaft portion 52 is similarly moved in a corresponding manner. The advantages of being able to move shaft portion 52 axially relative to shaft 53 will be readily apparent from the following description.

Shaft 53 has a collar 107 fixed thereto by a set screw 108 at a position arranged inwardly of slide 90 and in spaced apart relation from the terminal outer end of shaft portion or member 75 and member 75 has annular clutch teeth provided in its terminal outer end as shown at 106.

A worm gear 112 is supported on drive shaft 53 between clutch teeth 106 and collar 107 and worm gear 112 has an axial bore 113 extending therethrough of sufficiently large diameter which enables it to be supported on drive shaft 53 so that rotation of shaft 53 will not turn worm gear 112. Worm gear 112 also has clutch teeth 114 which are adapted to be moved into engagement with cooperating clutch teetch 106 of member 75 for a purpose to be hereinafter described.

Upon indexing a mandrel 42 into position at winding station 46 fluid cylinder 40 is at its retracted position essentially as illustrated in FIGURE 11 of the drawings and with driven clutch face 50 in spaced apart relation from driving clutch face 51 at the terminal end of shaft portion 52. Fluid cylinder 40 is then energized by suitable switch means provided on winding apparatus 32 immediately after a mandrel 42 is indexed into winding station 46 and mandrel 42 is thereby extended and yieldingly held into operative engagement with driving clutch face 51 as illustrated in FIGURE 13 of the drawings.

With the mandrel 42 thus extended it will be seen that the shaft portion 52 is urged axially inwardly from the position of FIGURE 10 to the position of FIGURE 12 along cylindrical bore 102 causing the terminal end 115 of shaft portion 52 to engage a cooperating surface 116 in drive shaft 53 and thereby urge shaft 53 and its collar 107 and worm gear 112 to the left as seen in FIGURE 12. With worm gear 112 thus urged to the left its clutch teeth 114 are moved into engagement with clutch teeth 106 to thereby operatively connect member 75, drive shaft 53, and worm gear 112 together so that subsequent rotation of shaft portion 75 will cause simultaneous rotation of worm gear 112.

It will be noted from FIGURE 12 of the drawings that this movement to the left caused by fluid cylinder 40 also causes the inner end portion of shaft 53 to compress spring 83 to the left. However, in this position the yieldable holding force provided by fluid cylinder 40 is greater than the force of compression spring 83 and spring 83 operates as an overtravel spring which is used to assure proper engagement of worm gear 112. In this position it will be seen that rotation of shaft portion 75 and hence drive shaft 53 will produce simultaneous rotation of worm gear 112.

As previously mentioned, elongated strip 27 is guided at winding station 46 so that the terminal end portion thereof which is being wound is held substantially in a fixed vertical plane during the winding thereof. It apparatus 32 were to be operated merely using the components described up to this point in the specification the resulting strip conductor coil would be substantially right circular cylindrical in peripheral outline having a cylindrical wall arranged between a pair of parallel surfaces defined by opposite edges of strip 27 as it is continuously wound at winding station 46. However, in many applications of an electrical strip conductor coil, or the like, it may be necessary to provide a coil construction having a configuration which must conform to the configuration of an associated housing, for example. Therefore, the unique apparatus and method presented herein enables the configuration of the coil construction to be varied by varying the axial position of the driving clutch face 51 and thus position mandrel 42 in a corresponding manner during the process of winding elongated strip 27 thereon. The freely rotatable mandrel 42 may be axially positioned so that the resulting coil construction may have side surfaces of any desired configuration. However, as seen in FIGURE 1 of the drawings, the resulting coil 25 formed in this exemplary illustration of the invention enables the provision of a coil 25 having substantially frusto-conical end surfaces; and, suitable means is provided which is mechanically driven by drive means or drive shaft 53 to control the winding of coil construction or coil 25 in a manner as will be hereinafter described.

The fluid cylinder 40 comprising apparatus 32 is of a known type which exerts a given yieldable force against its rod end 41 and such force is greater than the force exerted by spring 83. However, known construction cylinder 40 may be overridden while it continues to exert a substantially constant force against its rod end 41. Thus, if a contoured cam surface, for example, limits the movement of cylinder 40 to a position inward of its outer extension is that cylinder 40 holds its mandrel 42 tightly in position relative to such cam surface and follows its contour. This feature makes it possible to provide unique moving means, to be presently described, which move shaft portion 52 and hence mandrel 42, as desired.

Moving means designated generally by the numeral 120 is provided for moving the support means or freely rotatable mandrel 42 relative to the fixed plane in which the elongated strip 27 is guided for winding thereof. The exemplary moving means illustrated in FIGURES 5–9 comprises mechanical cam means shown as a rotatable mechanical cam 121 which is suitably mechanically connected to drive shaft 53. Rotatable cam 121 is operatively connected to drive shaft 53 by suitable mechanical linkage means comprising the moving means and to be presently described.

Figure 6:
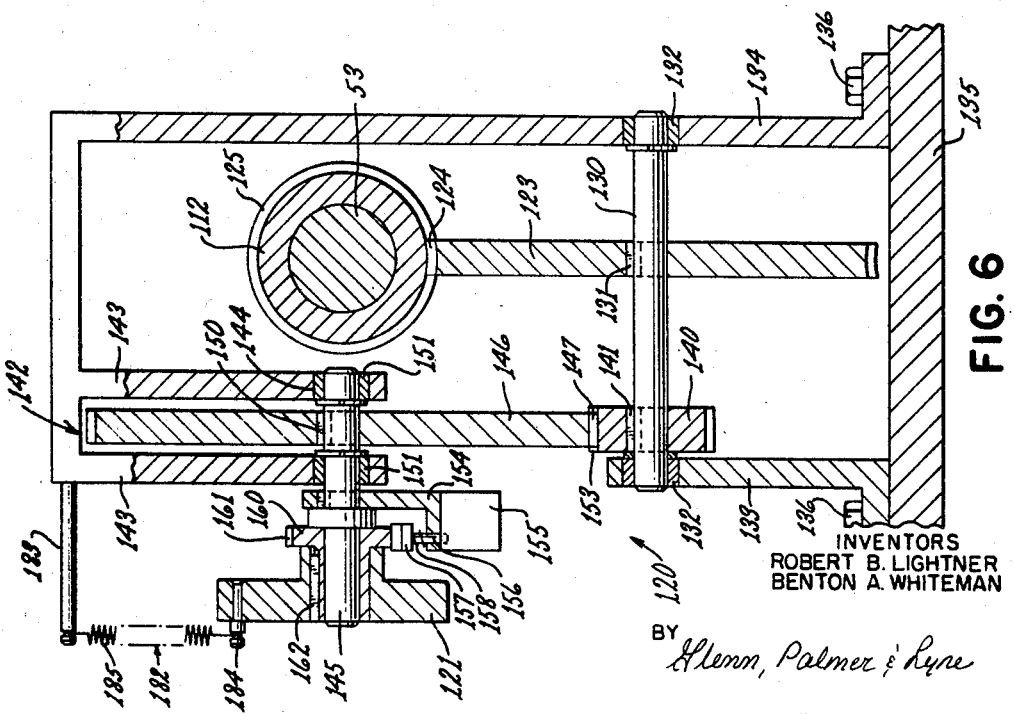
FIGURE 6 is a cross-sectional view taken on the line 6—6 of FIGURE 5.

The mechanical linkage means, see FIGURE 6, comprises a gear 123 which has gear teeth 124 intermeshed with gear teeth 125 of worm gear 112. In the position illustrated in FIGURE 10 of the drawings, gear 123 is not rotated because even though drive shaft 53 may be rotating teeth 114 of worm gear 112 are not engaged with cooperating teeth 106 of member 75 to thereby rotate worm gear 112 in the manner previously described.

Gear 123 is suitably keyed to a shaft 130 by a key 131 and shaft 130 is supported for essentially friction free rotation by a pair of spaced apart sleeve bearings each designated by the numeral 132 provided in a pair of upwardly extending members designated by the numerals 133 and 134 and each fixed to a support 135 which is suitably fixed to base structure 33. Vertically extending support members 133 and 134 are suitably fixed in position as by bolt means 136.

Shaft 130 is freely rotatable and is prevented from moving axially during rotation of gear 123 in any suitable manner. Shaft 130 also has a gear 140 which is keyed thereto in spaced apart relation from gear 123 by a key 141. As worm gear 112 is rotated by drive shaft portion 75 it will be seen that gear 123, shaft 130, and gear 140 are all simultaneously rotated.

Support member 134 has a frame like structure which extends above the axis of rotation of shaft portion 75 and is provided with an inverted substantially U-shaped supporting portion 142 having a pair of spaced apart legs each designated by the numeral 143. Each supporting leg 143 has an opening 144 extending therethrough and openings 144 are arranged in legs 143 in aligned relation so as to enable the installation of a suitable shaft 145 therethrough.

Another gear 146 having peripheral gear teeth 147 is provided and fixed to shaft 145 by a suitable key 150. Shaft 145 is supported by a pair of spaced apart bearings 151 each provided in an associated leg 143 and gear 146 is constructed and arranged so that it is driven by teeth 153 provided in gear 140 intermeshing therewith. As in the case of shaft 130 suitable means is provided to prevent axial movement of shaft 145 relative to its supporting legs 143. Thus, it is seen that as worm gear 112 is driven by member 75 gears 123, 140, and 146 are all rotated to thereby rotate shaft 145.

Shaft 145 has a supporting arm 154 suitably fixed thereto which in this exemplary illustration supports an actuator shown as an electrical solenoid 155 having a telescoping plunger 156 which carries a pawl 157 at its terminal end. Plunger 156 is normally urged outwardly by a compression spring 158 acting between the housing of solenoid 155 and pawl 157 so that pawl 157 is urged outwardly toward shaft 145.

A ratchet wheel 160 is freely rotatably supported on shaft 145 adjacent its terminal outer end portion. Ratchet wheel or gear 160 has teeth shown at 161 which are adapted to be engaged by pawl 157 so that upon engaging pawl 157 between a pair of adjacent ratchet teeth 161 wheel 160 is rotated by shaft 145 through the driving connection provided by pawl 157 and arm 154.

The previously mentioned cam means or rotatable cam 121 is fixed to wheel 160 by a suitable key 162 so that upon rotating wheel 160 cam 121 is also simultaneously rotated. Suitable means is also provided to prevent wheel 160 from moving axially relative to shaft 145.

Thus, it is seen that a driving force provided by drive shaft portion 75 is transmitted through a suitable mechanical linkage system to wheel 160 to thereby rotate rotatable cam 121. Further, the pawl 157 provided on solenoid 155 comprises coupling means which is adapted to couple gear or wheel 160 with drive shaft 53.

As seen particularly in FIGURES 5 and 7 of the drawings, slide 90 has bracket means shown as a bracket 165 fixed thereto and extending laterally outwardly therefrom. In addition, slide 90 is held in any suitable manner to prevent relative rotary movement between slide 90 and drive shaft 53.

Push rod means shown as push rod 166 is provided and has its outer end portion 167 fixed to slide 90 which, in effect, fixes rod 166 to axially slidable end portion 52 of shaft 53. Rod 166 preferably has threads 168 provided in its outer end 167 which are threadedly engaged in a cooperating threaded opening 170 provided in bracket 165.

The other end portion of rod 166 is positioned so that it is readily engaged by rotatable cam 121 and in this example of the invention the opposite end portion of rod 166 has a pin fixed thereto which rotatably carries a cam roller 171. As cam 121 rotates its outer cam surface 173 engages cam roller 171 to thereby move rod 166, slide 90, and hence end portion 52 to the right, as viewed in FIGURE 5.

This movement of end portion 52 to the right as caused by cam 121 is provided in a controlled manner and determined by the configuration of cam 121. In this example the cam surface 173 of cam 121 is provided so that the resulting coil 25 will have adjoining layers which are axially offset with respect to other layers thereof to provide a pair of side surfaces which are substantially frusto-conical as shown at 174 and 175 in FIGURE 8.

The movement of shaft portion 52 to the right is provided with a force which is sufficient to override the yieldable holding action of an associated fluid cylinder 40. The normal tendency of a fluid cylinder 40 is to hold its associated mandrel 42 in its fully extended position as shown in FIGURE 5 and with mandrel 42 indexed into position so that a core 26 comprising coil 25 is suitably held in position at winding station 46. The force exerted by end portion 52 is created by the action of cam 121 and is sufficient to continuously override fluid cylinder 40. Because fluid cylinder 40 maintains its pressure and continues to hold mandrel 42 outwardly with a given force, as previously mentioned, the result is that cam roller 171 precisely follows the contour of cam surface 173 to continuously control the axial position of mandrel 42 relative to the fixed plane in which the terminal end portion of strip 27 is being wound at station 46, whereby with the use of exemplary cam 121 coil 25 is produced having frusto-conical surfaces 174 and 175.

As previously mentioned, the driving gear 160 which rotates cam 121 is only rotated when pawl 157 engages teeth 161 of gear 160 and pawl 157 comprises coupling means for coupling gear 160 and hence cam 121 to drive shaft 53. The coupling of cam 121 is preferably controlled by driving clutch face 51 as it is engaged by driven clutch face 50 at the terminal end of mandrel 42, see FIGURE 5. In this example of the invention suitable switch means shown as an electro-mechanical switch 180 is provided and also comprises a portion of the coupling means of which pawl 157 is a part.

Electro-mechanical switch 180 is actuated by clutch pressure between driving clutch face 51 as it is engaged by clutch face 50 upon extending mandrel 42 into position at winding station 46. Switch 180 is electrically connected to solenoid 155 and cooperates therewith in such a manner that when switch 180 is actuated solenoid 155 is de-energized allowing spring 158 to urge pawl 157 into engagement with cooperating teeth 161 of rotary ratchet wheel or gear 160. When the switch 180 is deactuated, solenoid 155 retracts rod portion 156 to override spring 158 and disengage pawl 157 from ratchet gear 160. In this manner, it will be seen that the functioning of mechanical cam 121 is tied with the extending movement of a mandrel 42 into winding station 46.

Resetting means is provided for resetting the position of the rotatable cam 121. Resetting means is designated generally by the numeral 182 in FIGURES 8 and 9 of the drawings and such resetting comprises a pin 183 fixed to outer support leg 143 previously described. A cooperating pin 184 is suitably fixed to rotatable cam 121 and a tension spring 185 is extended between pins 183 and 184. As cam 121 rotates during the time that it is coupled to shaft 53, spring 185 will be extended and contracted in a known manner as pin 184 moves relative to pin 183.

After the completion of a given coil construction 25 as illustrated in FIGURE 8 of the drawings, the mandrel 42 is retracted in a manner as previously described. Upon retraction of mandrel 42, switch 180 will be deactuated as previously described causing solenoid 155 to retract plunger 156 and pawl 157 allowing gear 160 and cam 121 fixed thereto to rotate freely on shaft 145 under the influence of the resetting means 182.

In particular, it will be seen that spring 185 will rotate cam 121 to the position illustrated in FIGURE 9 and this represents the starting position from which cam 121 will be subsequently started to rotate by the action of the previously described coupling means. Thus, as another mandrel 42 is extended into winding station 46 pawl 157 is caused to engage teeth 161 of gear 160 and start rotation of cam 121 simultaneously with the winding of strip 27 on core 26 by shaft 53 to define another coil identical to coil 25 shown in FIGURES 1 and 8 of the drawings.

Having presented a detailed description of the apparatus and method which make possible the forming or winding of coil construction 25 illustrated in FIGURES 1 and 8, a brief general description will now be made to highlight the simplicity with which a complicated coil construction is easily made using the above described apparatus and method.

Accordingly, a mandrel 42 carrying a core 26 is indexed into position into winding station 46 in a manner as previously described. Immediately upon indexing mandrel 42 into winding station 46 if is positioned essentially as illustrated in FIGURE 11 of the drawings. Suitable switch means provided at winding station 46 is actuated in a known manner so that the mandrel 42 is extended by fluid cylinder 40 from the position illustrated in FIGURE 11 to the position illustrated in FIGURE 13 of the drawings.

As mandrel 42 is extended to the position shown in FIGURE 13, radially expandable portions provided thereon are urged radially outwardly to engage the inside surface of core 26 and thereby firmly hold such core in position to enable winding of the elongated strip 27 thereon. The detailed construction of mandrel 42 and particularly the detailed arrangement making possible the firm gripping of core 26 to enable winding strip 27 thereon will be described in detail subsequently.

With mandrel 42 moved to the position shown in FIGURE 13, it will be seen that collar 107 is correspondingly urged against worm gear 112 to move such worm gear so that its clutch teeth 114 are moved into clutching engagement with teeth 106 provided on member 75 comprising the inner end portion of drive shaft 53. Simultaneously with this movement the mechanical pressure between driven clutch face 50 and driving clutch face 51 actuates switch 180 causing solenoid 155 to release pawl 157 into engagement with teeth 161 of ratchet wheel 160. As switch 180 is actuated suitable switch means is energized to the drive motor which drives shaft portion 75 and hence drive shaft 53 to start shaft 53 rotating and start the winding of strip 27 on core 26.

Suitable means is provided for initially taping the inner end of strip 27 to core 26 to start the winding action as well as taping the outer end portion of strip 27 in position in the completed coil 25 and such means together with means employed to attach electrical leads 30 and 31 to strip 27 are described in detail in the cross-referenced copending Ser. No. 497,069.

As the driving clutch face 51 is engaged by driven clutch face 50 of freely rotatable mandrel 42 at the time that mandrel 42 is extended outwardly by fluid cylinder 40, shaft portion 52 is moved from the position of FIGURE 10 to the position of FIGURE 12 to thereby carry slide 90, bracket 165, and cam roller 171 into engagement with rotatable cam 121 as illustrated at 186 in FIGURE 5.

The fluid cylinder 40 yeildingly holds end portion 52 of shaft 53 to the left as viewed in FIGURES 5 and 12 and as the winding of strip 27 proceeds the mechanical force provided by cam 121 acting through the previously described mechanical linkage is imparted to shaft portion 52 to override the yieldable holding action of cylinder 40 and push the mandrel 42 away from the fixed vertical plane in which the terminal outer edge means of strip 27 is generally held by its guide means during the winding of coil 25. This action causes coil 25 to be formed having the configuration illustrated in FIGURE 8 and as determined by cam contour 173 and of cam 121.

Thus, it is seen that the unique apparatus and method of this invention make possible the forming of coil 25 having frusto-conical opposed side surfaces 174 and 175 to thereby enable the coil construction 25 to be readily installed in a housing means having a corresponding configuration.

The coil from 25 illustrated in FIGURES 1 and 8 of this example of the invention shows a coil construction in which surface means 174 and 175 are substantially frusto-conical; however, it will be appreciated that cam 121 may be suitably formed so as to provide a coil construction 25 in which the opposed end surfaces may have practically any desired configuration. Further, it is a simple matter to quickly and inexpensively change the coil form merely by replacing the cam plate 121 with another cam plate having the desired new configuration. Thus, the apparatus and method of this invention provide great versatility making it possible to provide new configuration coil constructions of all types economically and quickly and in a manner which is readily incorporated in a high volume production process.

Having described the detailed apparatus and method which makes possible the forming of coil 25 having an exemplary tapered configuration corresponding to the configuration of an associated housing means, or the like, the detailed description will now proceed with a detailed description of the radially expanded mandrel 42 which makes possible the easy pickup of a core 26 from within retainer 38 of apparatus 32, indexing of such core 26 to winding station 46, and suitably winding elongated strip conductor 27 thereon to form coil 25 in the manner previously described. Reference is now made to FIGURES 11 and 13–15 of the drawings wherein mandrel 42 is illustrated in detail.

Mandrel 42 has a freely rotatable support assembly 190 comprising a cylindrical member 191 having a threaded outer surface shown at 192 and a central bore 193 which extends completely therethrough and is provided with a counterbore 194 in one end thereof. Assembly 190 also has a sleeve-like member 195 provided with a threaded bore 196 in one end portion thereof and threads 196 are adapted to be threaded over threads 192 of member 191 to hold members 195 and 191 together. Member 195 also has cam surface means shown as a frusto-conical cam surface 197 provided in its opposite end portion and for a purpose to be described in detail subsequently.

Assembly 190 and hence the entire mandrel 42 is supported at the terminal end portion of rod 41 which is actuated by fluid cylinder 40 and in this example of the invention bearing means shown as a pair of spaced apart ball bearings each designated by the numeral 201 are provided in counterbore 194 for holding support assembly 190 and hence the entire mandrel 42 at the terminal end of rod 41. In this manner the entire mandrel 42 is freely rotatable so that it may be readily and easily driven by driving clutch face 51 fixed at the terminal end of drive shaft portion 52.

The bearings 201 are suitably fastened in position at the terminal end of rod 41 in any suitable manner and preferably have a spacer 202 arranged therebetween so as to provide a broader and more stable supporting surface as defined by spaced apart inner races of bearings 201. In this example of the invention bearings 201 are fixed to rod end portion 41 by press fitting their inner races against the outside diameter of rod 41 and member 191 is moved in position with cylindrical surface means defining its bore 194 engaging the outside races of bearing 201. Assembly 190 and hence mandrel 42 is prevented from being pulled off of rod 41 by any suitable means such as a split compressible ring or snap ring 203. Ring 203 is snapped into position in a cooperating groove 204 provided in member 191.

Rod 41 has a bore 205 extending axially inwardly from its terminal end and terminating in a surface 209 at its inner end to thereby define a blind hole in the terminal end of rod 41. Mandrel 42 has shaft means shown as a cylindrical terminal outer end portion and cylindrical shaft 206 is supported within bore 193 of member 191 and a cooperating aligned bore 207 in member 195 so that supporting shaft 206 extends substantially centrally through members 191 and 195.

Shaft 206 has a neck down right circular cylindrical portion 210 defining its terminal inner end and terminating in a circular surface 211. The outside diameter of cylindrical portion 210 is adapted to be easily inserted within bore 205 provided in the end portion of rod 41 so that cylindrical portion 210 is readily axially slidable along bore 205.

Shaft 206 has elongated slot means 212 extending therethrough substantially transverse to and along its longitudinal axis. Slot means or slot 212 has side surface means defining a controlled width and end surface means each designated by the numeral 212A defining a predetermined length for slot 212 whereby slot 212 is substantially rectangular in outline while extending diametrically across shaft 206. Slot 212 is adapted to allow movement of shaft 206 relative to member 195 and hence assembly 190 in a manner as will be presently described.

Member 191 has a passage 213 extending substantially diametrically thereacross and passage or bore 213 is adapted to receive a cooperating pin 214. Pin 214 has a thickness or diameter corresponding to the above mentioned controlled width of slot 212, i.e. the diameter of pin 214 is slightly smaller than the controlled width of slot 212.

With this construction it is seen that supporting shaft 206 is supported centrally along support assembly 190 and its rectangular slot 212 is aligned with cylindrical bore 213. Having thus aligned shaft 212 with respect to bore 213 pin 214 is then inserted in position to thereby provide coupling means coupling shaft 206 for simultaneous rotation with member 191 and hence support assembly 190 while allowing limited axial movement of shaft 206 relative to assembly 190. Shaft 206 is limited by end surface means 212A in its axial movement so that shaft 206 cannot be moved except for a limited distance on either side of pin 214.

With pin 214 installed in position through cylindrical opening 213 and through rectangular slot 212 of shaft 206, sleeve portion 195 is then threaded in position around shaft 206 so that its bore 207 provides a bearing surface for the outer portion of shaft 206 in a similar manner as bore 193 provides a supporting surface for the inner portion of shaft 206.

Urging means shown as an urging spring 216 is provided in mandrel 42 and such spring is carried within bore 205 so that it acts between surface 209 provided in rod 41 and surface 211 defining the terminal end of cylindrical end portion 210 of shaft 206. Spring 216 normally yieldingly urges shaft 206 to the left as viewed in FIGURE 11 of the drawings for reasons to be explained in detail hereinafter.

Support shaft 206 has a threaded terminal outer end as shown at 217 and driven clutch face 50 has a cooperating threaded bore 215 enabling it to be threaded in position at the terminal end of shaft 206 and suitably fixed in position as by a set screw 218. A guide bore 219 is also provided in the terminal end of shaft 206 which is adapted to guide a suitable guide pin 220 fixed at the outer end of shaft portion 52. Pin 220 and guide bore 219 cooperate to assure clutch faces 50 and 51 are properly intermeshed once mandrel 42 is telescoped outwardly so that its clutch face 50 engages clutch face 51.

Mandrel 42 also has a collar 221 provided with a central threaded opening 222 enabling collar 221 to be threaded axially along threads 217 of shaft 206. Collar 221 has cooperating cam surface means shown as a frustoconical cam surface 223 which cooperates with frustoconical cam surface 197 to provide a camming action for radially expandable means, to be presently described, supported between cam surfaces 197 and 223.

Mandrel 42 has holding means for holding core 26 and hence coil 25 on mandrel 42 and such holding means comprise a plurality of radially expandable cylindrical sectors three of which have been designated by the same numeral 224, see FIGURE 15, and a fourth one of which has been designated by the numeral 225. Cylindrical sectors 224 and 225 are identical with the exception that sector 225 has means for initially retaining a tubular core 26 on mandrel 42 to enable withdrawal of core 26 from associated retainer 38 of apparatus 32 and indexing thereof into winding position at station 46. Therefore, the detailed description will now proceed describing only those features which are common to all sectors 224 and 225. The detailed description of sector 225 will be made subsequently.

Cylindrical sectors 224 and 225 are constructed so that in their collapsed condition and with such sectors being held together against shaft 206 they cooperate to define a substantially cylindrical opening designated by the numeral 226. Sectors 224 and 225 are held against shaft 206 by suitable yielding means which in this example of the invention comprise a pair of spaced apart O-rings each designated by the numeral 230 and each being stretchable and made of a material which once the stretching force is released will return sectors 224 and 225 against support shaft 206.

Each sector 224 and 225 has substantially frustoconical surface means at its opposite ends designated by the numerals 231 and 232 respectively. With the cylindrical sectors 224 and 225 held by O-rings 230 against shaft 206 it will be seen that frusto-conical surface means 231 is aligned to cooperate with frusto-conical surface means 223 of collar 221 while frusto-conical surface means 232 is adapted to cooperate with frusto-conical surface means 197 provided in member 195.

Suitable means may be provided in association with one or more of the cylindrical sectors of mandrel 42 to prevent rotation of such sectors relative to shaft 206 as shaft 206 is rotated. In this example of the invention suitable key means shown as a key 234 is provided for association with each cylindrical sector. Each key 234 is received in a cooperating groove 235 in each associated cylindrical sector as well as in a cooperating groove 236 provided in collar 221. Thus, it is seen that cylindrical sectors 224 and 225 are yieldingly held by O-rings 230 against shaft 206 and are prevented from rotating with respect to shaft 206 by keys 234.

With mandrel 42 in its unclutched condition, shown in FIGURE 11, the yielding means or O-rings 230 cooperate with spring 216 to push shaft 206 to the left and keep cylindrical sectors collapsed against shaft 206. However, upon urging shaft 206 to the right, as will be presently described, the cam surfaces 197, 223, 231, and 232 cause cylindrical sectors 224 and 225 to be urged radially outwardly with respect to support shaft 206 to engage and firmly hold core 26.

As mandrel 42 is urged to the left from the position of FIGURE 11 the position of FIGURE 13 by fluid cylinder 40, in the manner previously described, driven clutch face 50 is urged into engagement with driving clutch face 51 at the terminal end of driving shaft portion 52. Support shaft 206 is thus urged to the right relative to support assembly 190, such relative movement being allowed by slot 212 causing cylindrical sectors 224 and 225 to be urged radially outwardly. This causes the outside diameter of such cylindrical sectors to be firmly urged against the inside surface of tubular core 26 and thereby hold core 26 firmly in position to enable winding of an elongated strip 27 therearound. Upon rotating mandrel 42 with drive shaft 52, through coupled clutch faces 50 and 51, it will be seen that the mandrel 42 is driven so that it freely rotates about its roller bearings 201.

The winding of strip 27 is commenced as previously described and as it continues the rotatable cam 121 urges end portion 52 to the right as viewed in FIGURE 13. This urging action is in turn transmitted through assembly 190 to rod end 41 to override cylinder 40 as previously described and provided unique configuration coil construction 25.

As previously indicated, cylindrical sector 225 is different from the other sectors 224 and its main difference is that sector 225 supports a core retaining means shown as a plunger or retainer 240. Cylindrical sector 225 has a cutout shown at 242 which is adapted to receive retainer 240 therein. Retainer 240 has a central opening 243 provided therein which is adapted to receive a compression spring 244. Spring 244 acts between sector 225 and surface means defining the inner portion of opening 243 to thereby urge retainer 240 outwardly away from sector 225.

Retainer 240 also has a pair of legs each designated by the numeral 247 extending from its opposite ends and dimensioned so as to extend beyond O-rings 230. Thus, as seen particularly in FIGURE 11 of the drawings, spring 244 urges retainer 240 radially outwardly so that its top surface extends above the outer surface of cylindrical sector 225.

The structural arrangement and height of retainer 240 is such that it is urged by spring 244 so that its leg portions 247 are urged against O-rings 230 to limit the outward movement thereof. However, upon inserting mandrel 42 within an associated tubular core 26 the retainer 240 is urged by spring 244 to initially retain core 26 on the mandrel 42. To enable easier insertion of mandrel 42 within an associated tubular core 26 retainer 240 has a chamfered or inclined forward end as shown at 250.

Thus, it is seen that mandrel 42 is of rugged construction and is supported for free rotation in a cantilevered manner at the terminal end of rod 41. Further, the radially expandable segments 224 and 225 comprising mandrel 42 provide a firm gripping or holding action along the entire elongated surface of inside surface means defining core 26. The construction of mandrel 42 makes it possible to use this type of expanding mandrel not only in coil winding operations but also in other applications where an expandable mandrel is required irrespective of whether it is necessary to rotatably support large heavy loads or comparatively light ones.

Having described one exemplary embodiment of moving means used to form coil 25 and an exemplary unique expandable mandrel for use in association therewith, another exemplary apparatus and method will now be described for positioning slide 90 and hence for axially positioning drive shaft 52 as a function of the desired configuration of the strip conductor coil to be wound.

Figure 16:
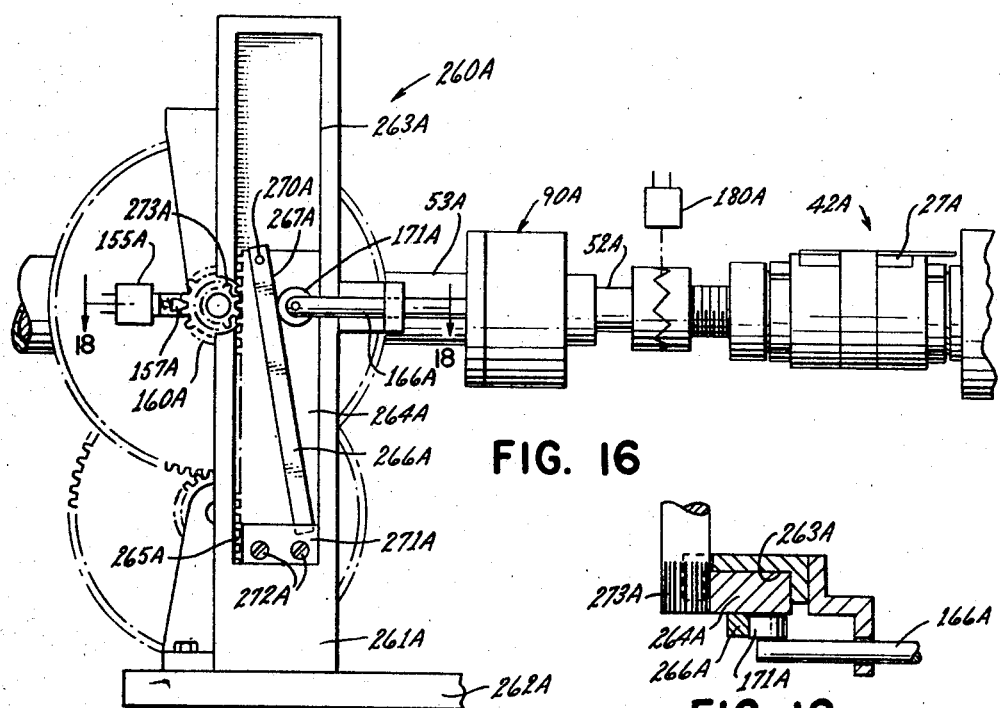
FIGURE 16 is a view in elevation with parts broken away particularly illustrating another embodiment of mechanical cam means used to provide a coil construction illustrated in FIGURE 1 and showing the apparatus prior to starting the winding of an exemplary coil construction.
Figure 18:
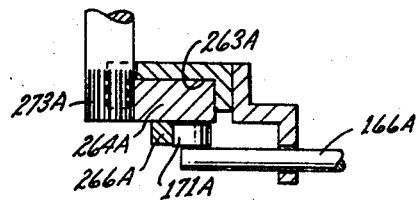
FIGURE 18 is a sectional view on the line 18—18 of FIGURE 16.
Figure 17:
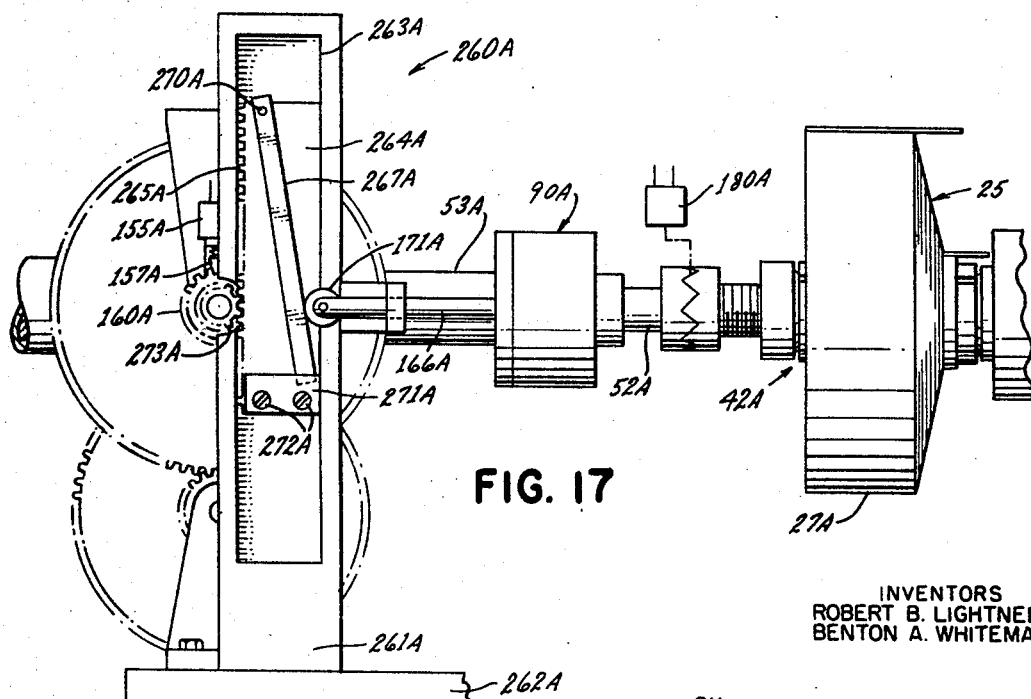
FIGURE 17 is a view similar to FIGURE 16 and illustrating the position of the cam means at the completion of a coil construction.

Accordingly, the description will now proceed referring particularly to FIGURES 16–18 of the drawings.

In the exemplary embodiment of this invention illustrated in FIGURES 16–18 of the drawings, the mechanical cam means provided is shown as a mechanical cam assembly designated generally by the numeral 260A. With the exception of mechanical cam assembly 260A the remainder of the moving means comprising this latter exemplary embodiment of the invention are identical to the previously described components and therefore the same reference numeral will be applied to corresponding identical components as previously followed by the letter designation A and a detailed description thereof will not be repeated. Only cam assembly 260A which is the only new portion will be described in detail and given new reference numerals also followed by the letter designation A.

Cam assembly 260A comprises a housing 261A supported on a suitable supporting base 262A and housing 261A is fixed to support 262A in any suitable manner. Housing 261A has a vertically arranged elongated slot of substantially rectangular outline provided therein and designated by the numeral 263A and slot 263A is adapted to receive a substantially rectangular slide means or slide 264A roughly corresponding in outline to the outline of slot 263A. Housing 261A supports slide 264A for vertical movement within its slot 263A.

Slide 264A has substantially vertically disposed rack means shown as a rack 265A provided along its rear edge means. Slide 264A also has an adjustably positioned cam bar 266A having inclined came surface means 267A fastened along the forward edge thereof. In this exemplary embodiment of the invention cam bar 266A is pivotally mounted adjacent the top end portion of slide 264A by a pin 270A and the lower portion of cam bar 266A is fixed in position by a clamping plate 271A at the lower end of slide 264A. Clamping plate 271A is held in position by a pair of set screws, or the like, each designated by the numeral 272A. With this structural arrangement it is a simple matter to change the angle of inclination of cam bar 266A merely by loosening cam plate 271A pivoting cam bar 266A as desired and then retightening plate 271A.

Cam surface 267A of cam bar 266A is adapted to engage cam roller 171A provided at the terminal end of cam rod 166A to provide a similar function of moving slide 90A and hence mandrel 42A as previously described in connection with the exemplary embodiment of this invention previously presented.

The coupling means including solenoid 155A and its pawl 157A and switch means 180A are used as previously to operatively couple and uncouple gear 160A with respect to drive shaft 53A. However, in this example of the invention a pinion gear designated by the numeral 273A is preferably fixed to gear 160A for simultaneous rotation therewith. Pinion gear 273A is adapted to engage the teeth of rack 265A and thereby move slide 264A vertically upwardly once gears 160A and 273A are rotated. Thus, the slide 264A moves from the position of FIGURE 16 to the position of FIGURE 17 which is its raised position.

As the slide 264A moves vertically upwardly it will be seen that cam roller 171A tracks along cam surface 267A to thereby move slide 90A, drive shaft portion 52A, and mandrel 42A to the right as viewed in FIGURE 17. This axially moves the mandrel 42A from the fixed vertical plane in which the elongated strip 27A is held for winding to produce the desired coil construction. In this example the configuration of cam bar 266A is such that the completed coil construction shown in FIGURE 17 is identical to coil construction 25 of FIGURE 1.

Once coil 25 is completed as shown in FIGURE 17, the pawl 157A is retracted in the same manner as previously described by the action of switch 180A and solenoid 155A whereby this retracting action allows gear 160A and pinion gear 273A to free wheel about their associated shaft. With this freedom to free wheel the force of gravity acting on slide 264A causes such slide to return from its upper position of FIGURE 17 to its lowermost position shown in FIGURE 16.

In effect, this provides resetting means for cam means or assembly 260A which utilizes the force of gravity. Thus, after the completion of each coil construction 25 and uncoupling of pinion 273A in the manner described above, the slide 264A and cam bar 266A will return to their lowermost position to enable forming of an identical coil 25 in the desired manner and essentially as described above. If it is desired to change the tapered configuration of the strip coil conductor being formed, it is merely necessary to change the inclination of the elongated cam bar 266A.

However, it will be appreciated that it is not necessary that the cam surface 267A provided on cam bar 266A must be a rectilinear cam surface. Indeed, it is entirely possible and may be required in certain applications of this invention to provide a cam surface on cam bar 266A which has a contoured configuration and such contoured configuration could be made to correspond with the desired form which is to be given to coil 25.

Thus, it is seen that two embodiments of the improved apparatus and method of this invention have been illustrated and described wherein a coil 25 has been provided by holding an elongated strip of material 27 being wound so that its edge means is held in a substantially fixed vertical plane during the winding thereof. The supporting mandrel therefor is moved with respect to such fixed plane so as to provide a coil construction having a desired configuration which corresponds to the amount and type of movement that is imparted to the supporting mandrel as coil construction 25 is formed.

In the exemplary embodiments of this invention presented in this disclosure elongated strip 27 is shown provided with electrical insulating means fixed thereto. However, the apparatus and method of this invention are particularly effective in forming a coil construction where the electrically conductive strip is wound simultaneously with an insulating strip provided in a separate roll because the ends of such strips being wound are held in a substantially fixed plane. In fact, it is very difficult to simultaneously wind an electrically conductive strip and an insulating strip to a tapered or contoured configuration by attempting to move such strips upstream of the winding mandrel to achieve the desired contour.

The previously described mechanical assembly particularly illustrated in FIGURE 6 of the drawings is basically used in its entirety in the embodiment of this invention which utilizes a rotatable cam surface as well as the embodiment which uses a cam bar as presented in FIGURES 16–18 of the drawings. It will be appreciated that the various diameters of gears, types of gear teeth, etc., will be determined by the particular coil construction which is desired to be formed in any given application of this invention and may be varied, as desired.

However, irrespective of the mechancal linkage used and the details of the particular gears employed, it is preferable that for one revolution of a rotatable cam surface or one complete excursion across a cam bar a particular coil construction will have been completed. For example, if coil 25 has 600 turns the gear ratio of the intermediate linkage is such that at the completion of the 600 turns defining coil 25 rotatable cam 121 will have made approximately one complete revolution in the first exemplary embodiment of this invention while cam bar 266A will have moved from its lowermost position to its uppermost position in the embodiment of FIGURES 16–18.

However, it will be appreciated that although this is a preferred technique it may be desirable to provide cam surface means in which, for example, a rotatable cam such as cam 121 may make more or less than one revolution during the time that a desired total number of turns is provided on the final coil construction.

The apparatus and method presented in this disclosure have been presented for controlling the axial movement of drive shaft means so as to control the axial position of a coil carrying mandrel during the winding of a coil construction on a coil winding apparatus; however, it will be appreciated that the particular mechanical linkage utilized and the technique of driving a mechanical cam means with the drive shaft used to wind a particular coil form may be utilized to provide other control functions for the coil winding apparatus. For example, it may be desired to provide one or more cam surface means which may be used to actuate suitable lead attaching means which enables the attachement of a plurality of leads on strip 27 as it is being wound to provide tap-off leads for a complicated coil form.

Terms such as "upwardly," "downwardly," "inwardly," "outwardly," "left," "right," and the like have been used in this disclosure of the invention for ease of description and merely to describe the various arrangements of component parts and their operation as illustrated in the drawings and such terms should not be considered as limiting the scope of this invention in any way.

Thus, it is seen that an improved apparatus for and method of making a coil construction have been provided by this invention.

While the present exemplary embodiments of this invention, and method of practicing same, have been illustrated and described, it will be recognized that the invention may be otherwise variously embodied and practiced within the scope of the following claims.

What is claimed is:

1. An apparatus for winding an elongated flat strip of material means to define a coil construction comprising, means supplying said material means to a winding station, said means supplying said material means comprising guide means supplying said material means so that edge means of the terminal end portion of said material means being wound is held substantially in a fixed plane during winding thereof, freely rotatable support means for supporting said material means to enable winding of said material means therearound to define said coil construction, said freely rotatable support means having a central axis of rotation arranged substantially transverse to said fixed plane, drive means for rotating said freely rotatable support means, and means mechanically driven by said drive means controlling the winding of said coil construction, said means mechanically driven by said drive means comprising moving means for moving said support means relative to said fixed plane to provide said coil construction having certain coils axially offset relative to other coils of said coil construction.

2. An apparatus as set forth in claim 1 in which said moving means comprises mechanical cam means.

3. An apparatus for winding material means to define a coil construction comprising, means supplying said material means to a winding station, said means supplying said material means comprising guide means supplying said material means so that edge means of the terminal end portion of said material means being wound is held substantially in a fixed plane during winding thereof, freely rotatable support means for supporting said material means to enable winding of said material means therearound to define said coil construction, said freely rotatable support means having a central axis of rotation arranged substantially transverse to said fixed plane, drive means for rotating said freely rotatable support means, means mechanically driven by said drive means controlling the winding of said coil construction, said means mechanically driven by said drive means comprising moving means for moving said support means relative to said fixed plane to provide said coil construction having certain coils axially offset relative to other coils of said coil construction, and actuating means for extending and yieldingly holding said support means into operative engagement with said drive means, said moving means comprising means moving said drive means in opposition to the holding action of said actuating means to move said support means relative to said fixed plane and along said axis of rotation.

4. An apparatus particularly adapted for winding material means comprising an elongated strip of electrically conductive material to define a coil construction said apparatus comprising, means supplying said material means to a winding station, said means supplying said material means comprising guide means supplying said material means so that edge means of the terminal end portion of said material means being wound is held substantially in a fixed plane during winding thereof, freely rotatable support means for supporting said material means to enable winding of said material means therearound to define said coil construction, said freely rotatable support means having a central axis of rotation arranged substantially transverse to said fixed plane, drive means for rotating said freely rotatable support means, means mechanically driven by said drive means controlling the winding of said coil construction, said means mechanically driven by said drive means including mechanical cam means for moving said support means relative to said fixed plane to provide said coil construction having certain coils axially offset relative to other coils of said coil construction, driving clutch face means provided at the terminal end of said drive means, driven clutch face means provided at the terminal end of said support means, and actuating means for extending and yieldingly holding said support means with its driven clutch face means in operative engagement with said driving clutch face means, wherein said mechanical cam means moves said driving clutch face means in opposition to the holding action of said actuating means to move said support means relative to said fixed plane and along said axis of rotation.

5. An apparatus as set forth in claim 4 in which said moving means further comprises mechanical linkage means operatively connectting said cam means to said drive means to thereby use the rotary output of said drive means during winding of said elongated strip of material to operate said cam means as well as rotatably drive said driving clutch face means.

6. An apparatus as set forth in claim 5 in which said drive means comprises a drive shaft having an axis of rotation coinciding with said central axis of rotation and an end portion which is supported at the terminal outer end of said drive shaft for controlled axial movement relative thereto while being coupled for rotation therewith, said driving clutch face means being fixed to the terminal outer end of said end portion, and said moving means further comprises a push rod means engaged by said cam means at one end and having its opposite end operatively connected to said end portion to provide said controlled axial movemen therefor and for said driving clutch face means as determined by the configuration of said cam means.

7. An apparatus as set forth in claim 6 in which said cam means comprises rotatable cam means having peripheral cam surface means adapted to engage said one end of said rod means and said mechanical linkage means comprises, rotatable gear means connected to said rotatable cam means to rotate said rotatable cam means therewith, coupling means for coupling said gear means to said drive shaft means and uncoupling said gear means therefrom to thereby couple and uncouple said cam means in a corresponding manner, and control means for controlling the coupling and uncoupling action of said coupling means.

8. An apparatus as set forth in claim 7 further comprising resetting means for resetting the position of said rotatable cam means after uncoupling said coupling means, said resetting means comprising yielding spring means for rotating said cam means to a fixed initial position.

9. An apparatnus as set forth in claim 6 in which said cam means comprises; slide means supported for vertical movement, a cam bar fixed along one vertical side of said slide means and having cam surface means adapted to engage said rod means, substantially vertically disposed rack means provided on said slide means generally opposite said cam bar, and pinion gear means cooperating with said rack means to move said slide means and cam bar vertically upwardly upon rotating said pinion gear means; and said mechanical linkage means comprises, rotatable gear means operatively connected to rotate said pinion gear therewith, coupling means for coupling said rotatable gear means to said drive shaft means and uncoupling said rotatable gear means therefrom to thereby couple and uncouple said cam bar in a corresponding manner, and control means for controlling the coupling and uncoupling action of said coupling means.

10. An apparatus as set forth in claim 9 further comprising means for adjusting the position of said cam bar on said slide to thereby adjust its cam surface means and said cam means is physically arranged so that said slide means and cam bar is lifted vertically upwardly by the action of said pinion gear engaging said cooperating rack means during winding of a given coil construction, and upon uncoupling said rotatable gear means after said given coil construction is completed said pinion gear is allowed to free wheel so that the weight of said slide means causes it to drop to its lowermost position and reset said cam bar for the winding of another coil construction.

11. A method of winding an elongated strip of electrically conductive material to define a coil construction comprising the steps of, providing said strip of electrically condunctive material, supplying said strip to a winding station so that edge means of the terminal end portion of said strip being wound is held substantially in a fixed plane during winding thereof, providing freely rotatable support means for supporting said strip during winding thereof to define said coil construction, said freely rotatable support means having a central axis of rotation arranged substantially transverse to said fixed plane, providing drive means comprising driving clutch means adapted to engage driven clutch means fixed to said support means to enable rotating said support means, winding said strip around said support means by operatively engaging said clutch means and rotating said support means with said drive means to define said coil construction, providing moving means, and moving said support means relative to said fixed plane with said moving means by moving said moving means with means mechanically driven by said drive means while winding said strip on said support means to provide said coil construction having certain coils axially offset relative to other coils of said coil construction.

12. A method of winding an elongated strip of electrically conductive material to define a coil construction comprising the steps of, providing said strip of electrically conductive material, supplying said strip to a winding station so that edge means of the terminal end portion of said strip being wound is held substantially in a fixed plane during winding thereof, providing freely rotatable support means for supporting said strip during winding thereof to define said coil construction, said freely rotatable support means having a central axis of rotation arranged substantially transverse to said fixed plane, providing drive means for rotating said support means, winding said strip around said support means by rotating said support means with said drive means to define said coil construction, providing moving means, moving said support means relative to said fixed plane with said moving means while winding said strip on said support means to provide said coil construction having certain coils axially offset relative to other coils of said coil construction, providing actuating means for said support means, and extending and yieldingly holding said support means into operative engagement with said drive means with said actuating means, said moving step comprising moving said drive means in opposition to the holding action of said actuating means to move said support means relative to said fixed plane and along said axis of rotation.

13. A method of winding an elongated strip of electrically conductive material to define a coil construction comprising the steps of, providing said strip of electrically conductive material, supplying said strip to a winding station so that edge means of the terminal end portion of said strip being wound is held substantially in a fixed plane during winding thereof, providing freely rotatable support means for supporting said strip during winding thereof to define said coil construction, said freely rotatable support means having a central axis of rotation arranged substantially transverse to said fixed plane, providing drive means for rotating said support means, winding said strip around said support means by rotating said support means with said drive means to define said coil construction, providing moving means, said step of providing moving means comprising the step of providing mechanical cam means for moving said support means, moving said support means relative to said fixed plane with said moving means while winding said strip on said support means to provide said coil construction having certain coils axially offset relative to other coils of said coil construction, providing driving clutch face means at the terminal end of said drive means, providing driven clutch face means at the terminal end of said support means, providing actuating means for said support means, and extending and yieldingly holding said support means with said actuating means so that its driven clutch face means is held in operative engagement with said driving clutch face means, whereby during said moving step said driving clutch face means is moved by said mechanical cam means in opposition to the holding action of said actuating means to move said support means relative to said fixed plane and along said axis of rotation.

14. A method as set forth in claim 13 in which said step of providing moving means further comprises providing mechanical linkage means and comprising the further step of operatively connecting said cam means to said drive means with said mechanical linkage means to thereby use the rotary output of said drive means during said winding step to operate said cam means as well as rotatably drive said driving clutch face means.

15. A method as set forth in claim 14 in which said step of providing drive means comprises providing a drive shaft having an axis of rotation coinciding with said central axis of rotation and having an end portion which is supported at the terminal outer end of said drive shaft for controlled axial movement relative thereto while being coupled for rotation therewith, said step of providing driving clutch face means comprises fixing said driving clutch face means at the terminal outer end of said end portion, and said step of providing moving means further comprises providing push rod means and operatively connecting one end of said push rod means to said one end portion with the opposite end of said push rod means being positioned to be readily engaged by said cam means during said moving step to provide said controlled axial movement therefor and for said driving clutch face means as determined by the configuration of said cam means.

16. A method as set forth in claim 15 in which said step of providing cam means comprises providing rotatable cam means having peripheral cam surface means adapted to engage said one end of said rod means and said step of providing mechanical linkage means comprises the steps of, providing rotatable gear means, operatively connecting said rotatable cam means to said rotatable gear means to enable simultaneous rotation therewith, providing coupling means for coupling said gear means to said drive shaft means and uncoupling said gear means therefrom to thereby couple and uncouple said cam means in a corresponding manner, providing control means, and controlling the coupling and uncoupling action of said coupling means with said control means to thereby control the coupling and uncoupling of said rotatable cam means with said drive shaft means.

17. A method as set forth in claim 16 comprising the further steps of providing resetting means and resetting the position of said rotatable cam means with said resetting means after uncoupling said coupling means to enable precise forming of another coil construction having said certain coils axially offset relative to other coils of said coil construction.

18. A method as set forth in claim 15 in which said step of providing cam means comprises the steps of, providing slide means supported for vertical movement, providing a cam bar having cam surface means adapted to engage said rod means, fixing said cam bar along one vertical side of said slide means, providing substantially vertically disposed rack means on said slide means generally opposite said cam bar, providing pinion gear means for cooperation with said rack means to move said slide and cam bar vertically upwardly upon rotating said pinion gear means; and said step of providing mechanical linkage means comprises, providing rotatable gear means operatively connected to said pinion gear means, providing coupling means for coupling said rotatable gear means to said drive shaft means and uncoupling said rotatable gear means therefrom to thereby couple and uncouple said cam bar in a corresponding manner, providing control means, and controlling the coupling and uncoupling action of said coupling means with said control means, such that upon coupling said coupling means said pinion gear means is operatively coupled to said drive shaft means to thereby move said cam bar and provide said controlled axial movement.

19. A method as set forth in claim 18 comprising the further step of resetting said cam means after the completion of a given coil construction by effectively using the force of gravity acting on said slide means to enable winding of another coil construction identical to said given coil construction, said resetting action being achieved by arranging said cam bar and rack means relative to said pinion gear means so that upon initially coupling said pinion gear means to said drive means at the commencing of winding said given coil construction said pinion gear continuously moves said cam bar and slide means vertically upwardly and upon completion of said given coil construction and uncoupling of said pinion gear means said pinion gear means is allowed to free wheel and utilize the force of gravity acting against said slide to return it to its lowermost position and reset said cam bar.

20. A method as set forth in claim 18 comprising the further steps of providing adjusting means and adjusting the position of said cam bar with said adjusting means to thereby change the effective position of said cam surface means and change the configuration of said coil construction.

References Cited

UNITED STATES PATENTS

| | | | |
|---|---|---|---|
| 2,927,415 | 3/1960 | Smith | 242—10 X |
| 2,956,755 | 10/1960 | Ottenheimer et al. | 242—9 |
| 2,962,242 | 11/1960 | Adams et al. | 242—158.4 |
| 2,964,252 | 12/1960 | Rosenberg | 242—9 |
| 3,047,245 | 7/1962 | George | 242—9 |
| 3,237,875 | 3/1966 | Van Der Hock et al. | 242—9 X |

JOHN F. CAMPBELL, Primary Examiner

C. E. HALL, Assistant Examiner

U.S. Cl. X.R.

29—25.42, 203; 140—92.1; 242—9, 158.5